United States Patent [19]

Schmidt

[11] Patent Number: 4,635,765
[45] Date of Patent: Jan. 13, 1987

[54] ADJUSTABLE HYDRAULIC DAMPER APPARATUS

[75] Inventor: Rudolf Schmidt, Eitorf, Fed. Rep. of Germany

[73] Assignee: Boge GmbH, Eitorf, Fed. Rep. of Germany

[21] Appl. No.: 626,313

[22] Filed: Jun. 29, 1984

[30] Foreign Application Priority Data

Jun. 29, 1983 [DE] Fed. Rep. of Germany ....... 3323405
Sep. 22, 1983 [DE] Fed. Rep. of Germany ....... 3334255
Mar. 7, 1984 [DE] Fed. Rep. of Germany ....... 3408267

[51] Int. Cl.$^4$ ............................................. F16F 9/46
[52] U.S. Cl. .................................... 188/299; 188/319; 188/322.13; 200/160
[58] Field of Search ............... 188/319, 299, 289, 278, 188/279, 280, 281, 282, 317, 320, 322.15, 322.13, 322.16, 322.22; 74/99 A, 110; 200/160; 401/112; 251/322

[56] References Cited

U.S. PATENT DOCUMENTS

| | | | |
|---|---|---|---|
| 2,592,656 | 4/1952 | Catranis | 188/320 X |
| 2,780,321 | 2/1957 | Sturari | 188/319 |
| 2,865,396 | 12/1958 | Focht | 188/289 X |
| 3,039,566 | 6/1962 | Rumsey | 188/299 |
| 3,191,329 | 6/1965 | Shea | 401/112 X |
| 4,313,529 | 2/1982 | Kato et al. | 188/319 X |
| 4,319,106 | 3/1982 | Armitage | 200/160 X |
| 4,337,850 | 7/1982 | Shimokura | 188/319 |
| 4,463,839 | 8/1984 | Ashiba | 188/319 X |
| 4,476,967 | 10/1984 | Tetsuo | 188/319 |
| 4,527,676 | 7/1985 | Emura et al. | 188/319 X |

FOREIGN PATENT DOCUMENTS

| | | | |
|---|---|---|---|
| 2449488 | 4/1976 | Fed. Rep. of Germany | 188/319 |
| 2911768 | 10/1980 | Fed. Rep. of Germany | |
| 3241984 | 6/1983 | Fed. Rep. of Germany | |
| 1073060 | 9/1954 | France | 188/285 |
| 1103484 | 12/1955 | France | 188/282 |
| 626435 | 10/1961 | Italy | 188/315 |
| 6717020 | 6/1969 | Netherlands | 188/317 |
| 290983 | 11/1928 | United Kingdom | 188/319 |

Primary Examiner—Duane A. Reger
Assistant Examiner—Michael P. Gilday
Attorney, Agent, or Firm—Nils H. Ljungman

[57] ABSTRACT

The invention provides an improved adjustable hydraulic apparatus of the type having a hollow piston rod operably associated with a damping piston means which divides the interior of a cylinder member into first and second halves filled with damping fluid. At least one throttle means is operably associated with the damping piston means. The hollow piston rod includes a traverse bore disposed above the damping piston means for the constant passage of damping fluid therethrough. An axially displaceable tension rod is disposed within the interior of the hollow piston rod and is operably associated with an adjusting device. The improvement to the damper apparatus, according to this invention, provides an annular gap defined by the tension rod in combination with the inner surface of the hollow piston rod, which functions as a throttle restriction. The tension rod includes a recessed portion adjacent the annular gap which provides an opening of increased cross-sectional dimension as the tension rod moves with respect to the hollow piston. The lower portion of the tension rod is also associated with a control piston means which is axially displaceable within valve body disposed within the interior of the cylinder.

23 Claims, 6 Drawing Figures

ADJUSTABLE HYDRAULIC DAMPER APPARATUS

BACKGROUND OF THE INVENTION

1. Field of the Invention

The invention relates to an adjustable hydraulic damper with a damping piston which is secured on a hollow piston rod and divides the working cylinder into two chamber halves filled with damping fluid and has at least one throttle member, a constant oil passage being present through a transverse bore arranged above the damping piston and the interior of the piston rod, and for adjusting the damping force, an axially displaceable tension rod is arranged in the interior of the piston rod and is connected to an electro-magnet comprising a coil and an armature.

2. Description of the Prior Art

An hydraulic damper is disclosed in DE-OS No. 29 11 768, in which regulation is achieved by an electro-magnet and by which the adjustment of the damping force is possible at low piston speeds. A drawback in this arrangement is that no change in the damping force is possible at medium and high piston speeds. Moreover, no change in the valve force at medium piston speeds is possible since the piston rod simply acts to hold a corresponding by-pass open or closed.

In order to adjust damping forces at low and medium piston speeds, a variable oil pressure technique has been proposed in DE-PS No. 894 965. In such a construction, in additon to the change in the cross-section of the passage, the pre-loading of the valve spring is altered by means of oil pressure, for which, in a disadvantageous manner, throttle setting devices and corresponding pipe systems are necessary.

SUMMARY OF THE INVENTION

The invention provides an improved adjustable hydraulic apparatus of the type having a hollow piston rod operably associated with a damping piston means which divides the interior of a cylinder member into first and second halves filled with damping fluid. At least one throttle means is operably associated with the damping piston means. The hollow piston rod includes a traverse bore disposed above the damping piston means for the constant passage of damping fluid therethrough. An axially displaceable tension rod is disposed within the interior of the hollow piston rod and is operably associated with an adjusting device. The improvement to the damper apparatus, according to this invention, provides an annular gap defined by the tension rod in combination with the inner surface of the hollow piston rod, which functions as a throttle restriction. The tension rod includes a recessed portion adjacent the annular gap which provides an opening of increased cross-sectional dimension as the tension rod moves with respect to the hollow piston. The lower portion of the tension rod is also associated with a control piston means which is axially displaceable within a pot-like valve body disposed within the interior of the cylinder.

BRIEF DESCRIPTION OF THE DRAWINGS

Preferred embodiments of the invention, by way of example, are illustrated diagrammatically in several drawings in which.

DETAILED DESCRIPTION OF THE INVENTION

Figure 1:
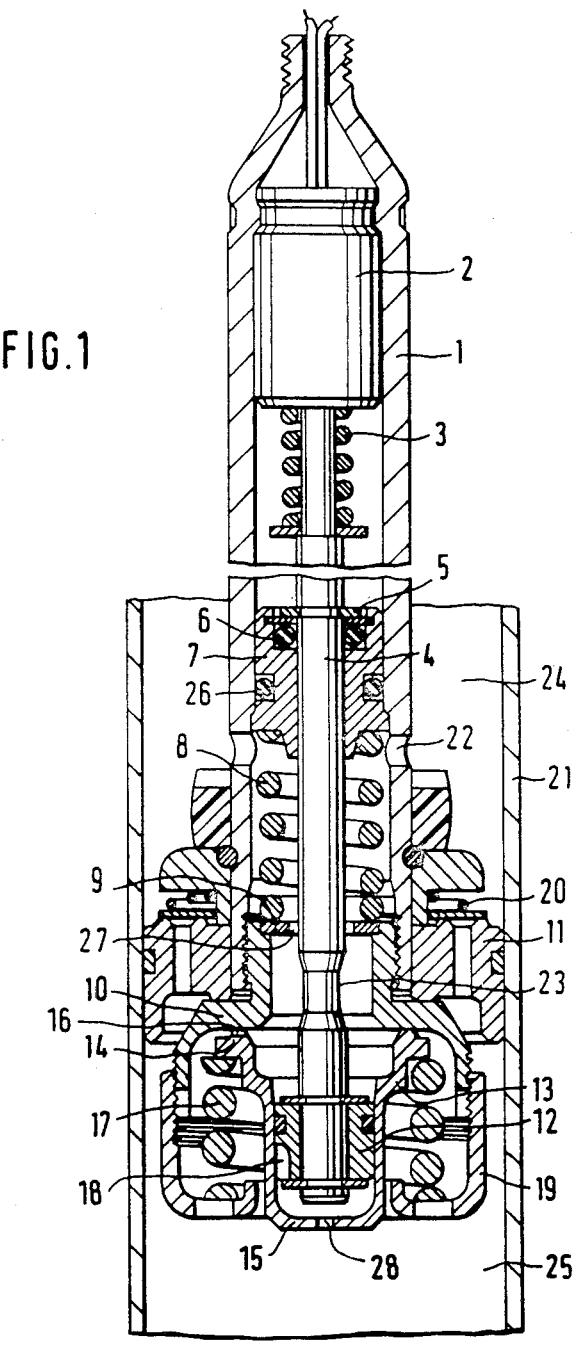
FIG. 1 is a section through an adjustable hydraulic damper.

It is an object of this invention to provide a damper in which the damping forces can be adjusted electrically at different piston speed ranges. To solve this problem, it is provided that the tension rod forms, with the inner surface of the piston rod, directly or through a corresponding device, an annular gap acting as a throttle, at least one recess being provided on the outer surface of the tension rod in the region adjacent the annular gap, this recess providing over a corresponding working range of the armature an annular gap of greater cross-section, and that the end region of the tension rod receives a control piston which is guided to slide axially in the cylindrical inner surface of a pot-like valve body. As a further embodiment the valve body, acted on by a spring, has between its face and the region which is nearest the damping piston a permanent oil passage and has in the base of the valve body a further oil passage which can be closed off by the control piston.

In this arrangement, it is of advantage that the damping force, and with it the valve force, can be altered by means of the electro-magnet at medium piston speeds, in that simultaneously the damping force can be altered at low piston speeds by means of an additional constant passage and the damping force at higher piston speeds can be altered by altering the cross-section for flow. In this arrangement, the constant oil throttle passage and the surface of the valve disc which is acted on are made to be adjustable so that an electro-magnet of small construction is sufficient since the relatively high valve spring and damping forces do not themselves have to be varied.

According to a further important feature of the invention, it is provided that the recess on the outer surface of the tension rod is in the form of an annular groove. An advantage of this embodiment is that a simple machining of the tension rod is all that is needed because of the rotationally symmetrical nature of the groove. After the axial change in position of this recess through the action of the magnet, a greater throttling cross-section is uncovered. By means of the outside diameter of the tension rod, therefore, different throttle cross-sections can be achieved for the behavior in the extension stage at high piston speeds.

A relatively simple possibility for manufacture to form a corresponding annular gap for the extension phase at high postion speeds is to be seen in providing a disc in the interior of the piston rod or in the inner wall of a securing nut connected to the piston rod.

A further embodiment provides that the permanent oil passage is formed by a collar on the pot-like valve body and the face of a securing nut, the valve spring abutting, on the one hand, on the underside of the collar and, on the other hand, against an abutment surface on a threaded ring connected to the securing nut. The constant oil flow passage in this arrangement is formed with advantage on the circumferentially extending control edge and is effective at low piston speeds.

According to a further important feature, it is provided that the valve body has an inside diameter which increases progressively from the cylindrical inner surface towards the permanent oil passage. This diverging region is then effective when the tension rod and accordingly, the control piston is displaced upwards, when the electro-magnet is energized, into a predetermined position so that a passage between the control piston and the valve body is uncovered. This passage allows the oil pressure to act on the whole inner face of the valve body so that, by virtue of the resulting greater area which is acted on, lower damping forces arise at the same piston speed range. At the same time, the further constant oil passage present in the base of the valve body is also uncovered so that low damping forces are produced, even at low piston speeds.

In order to achieve trouble-free guiding of the tension rod and to protect the electro-magnet from the damping medium, the tension rod is guided and sealed in a bearing mounted in the interior of the piston rod. A preferred embodiment of this bearing has on its cylindrical outer surface and/or on its cylindrical inner surface an annular groove for receiving a seal.

In order to seal off the additional constant oil passage when the electro-magnet is de-energized, the outer surface of the control piston is provided with an annular groove for receiving a piston ring.

In a further embodiment, the electro-magnet cooperates with a control unit. In such an embodiment of the invention, the control unit can be acted on by desired value output of a computer or micro processor so that data, such as vehicle speed, road condition and load condition, can be evaluated and on the basis of this information, the necessary damping force can be provided to match the corresponding data, a corresponding energization of the electro-magnet being possible.

According to a further important embodiment, it is provided that the valve body has, in its base, an opening corresponding to the cross-section of the tension rod and that the tension rod has in the region of the valve body a longitudinal bore which is closed at the end of the rod, this bore being provided above and below the control piston with at least one respective radially extending opening for flow, the lower opening leading, in the upper working position of the tension rod, into the interior of the valve body and in the lower working position of the tension rod into the lower chamber half.

In this arrangement, it is of advantage that the damping force, and thereby the valve force, can be altered by means of the adjustment device at all piston speeds, in that the tension rod, with its recess and the openings for flow, can be brought into a corresponding working position. In this arrangement, according to the use to which it is put, it is possible, corresponding to the axial position of the control piston, to achieve low damping forces in the medium piston speed range and high damping forces in the low piston speed range. In the opposite position of the control piston, by contrast, high damping forces can be achieved in the medium piston speed range and low damping forces in the low piston speed range. Moreover, it is of advantage that only a small adjusting device matching the forces is sufficient in order to achieve control of the tension rod, since there is no need for high valve spring and damping forces to be controlled.

According to a further important feature, it is provided that holes are arranged, extending at right angles to the longitudinal axis of the tension rod, to form the radial openings for flow. These holes are easy to produce in manufacture at low cost and without difficulties.

A further embodiment provides that the end of the tension rod is closed by a closure disc, so that a simple manufacturing technique is possible for forming the blind bore. Furthermore, it is provided that the closure disc is force-fitted into the tension rod.

According to a further important feature of the invention, it is provided that an electric motor or an electro-magnet is employed as the adjusting means. By the constant oil throttling passages and the variable area of the valve body which is exposed, such small electro-magnets or electric motors achieve sufficient control of the tension rod, because the relatively high valve spring forces and damping forces do not themselves need to be controlled. A further variability is achieved by making the recess with at least two stepped shoulders and the adjusting means provide a number of working positions of the tension rod corresponding to the number of steps.

To achieve a short electrical switch-on time and/or the need for a minimum of force, it is provided, according to the invention, that a switch device is arranged between the adjusting means and the tension rod, the switch device having positions corresponding to at least two axially different positions on the tension rod, the tension rod being urged towards the adjusting device by a spring. In such a device it is of advantage that not only can it be mounted within the hollow piston rod but that by a switch device a force is only required for the actual period of the change in position, thus saving energy. This results in a short switch-on time so that electro-magnets of correspondingly small size can be employed.

According to a further important feature of the invention, it is provided that the switching device comprises a housing, a control rod and rotating portion. This results in a compact construction which, given a corresponding outside diameter, can be pressed or otherwise secured in the interior of the hollow piston rod. It has been found particularly advantageous for the adjusting means to take the form of an electro-magnet.

In a particularly preferred embodiment, it is provided that the control rod and the rotating portion are provided on their mutually opposed faces with respective toothed faces and axially extending grooves on the periphery, the grooves being axially movably guided in corresponding axially extending ribs in the housing. In this embodiment, it is of advantage that, by means of the toothed face, the rotating portion receives a movement in a peripheral direction during the switch movements and after clearing the guide ribs on the housing, so that thereby different axial positions are reached. To achieve trouble-free function and to allow manufacture from rotationally symmetrical components, the grooves and ribs are distributed uniformly around the periphery. It is furthermore provided that the rotating portion is kept in face-to-face contact with the tension rod by means of a coil spring so as to impart the displacements to the tension rod without problems. According to a further embodiment, it is provided that the armature spindle of the electro-magnet acts on the control rod.

The section through an adjustable hydraulic damper illustrated in FIG. 1 shows substantially the cylinder barrel 21, the hollow piston rod 1, on the end of which is secured the damping piston 11. The damping piston 11 divides the interior of the cylinder 21 into two chamber halves 24 and 25. On the upper end of the damping piston 11 is the contraction phase valve 20.

On the upper end of the hollow piston rod 1 and within it, there is arranged a fixed electro-magnet 2, into which extends the axially displaceable tension rod 4, acted on by a return spring 3. The hollow piston rod 1, under the action of the spring 3, abuts through a retaining ring 5 against the tension rod bearing 7. To seal the bearing 7 with respect to the tension rod 4 and the hollow piston rod 1, there are O-rings 6 and 26. The bearing 7 is held in its axial position by a helical spring 8 which abuts at its lower end against a disc 9 on the securing nut 10 of the damping piston 11. Formed between the tension rod 4 and the disc 9 is the annular gap 27 which acts as the throttle and which determines the behavior in the extension phase at high piston speeds.

When the tension rod 4 is pulled upwards by the electro-magnet 2, an increased annular gap 27 arises between the disc 9 and the recess 23 in the tension rod 4, resulting in lower forces in the extension phase at high piston speeds. Thus, with the electro-magnet 2 energized and accordingly with the tension rod 4 in its upper position, low damping forces are produced in the extension phase in all speed ranges of the damping piston 11.

The tension rod 4 has at its lower end a control piston 12 which is guided to be axially movable in the valve body 13. The control lip 14 which extends around the periphery of the valve body 13 defines a constant oil passage 16. Arranged in the base 15 of the valve body 13 is a further constant oil passage 28 which is open or closed according to the position of the control piston 12.

With the control piston 12 in the position illustrated, the inside diameter of the control lip 14 of the valve body 13, loaded by the spring 17, forms a small surface exposed to the outside diameter of the control piston 12 so that consequently high damping forces are produced in the medium speed range of the piston. At the same time, only the constant oil passage 16 in the valve body 13 is effective so that even at small piston speeds high damping forces are produced. In addition, a small constant oil passage is formed at the same time between the tension rod 4 and the disc 9, so that also at high piston speeds high damping forces are produced. When the tension rod 4 and accordingly, the control piston 12 are drawn to the upper position by the electro-magnet 2, pockets 18 which become free in the control piston 12 and, in connection with it the increasing diameter of the valve body 13, allow the oil pressure to act on the entire inner face of the valve body 13 so that the consequent increased area acted on in the medium piston speed range allows lower damping forces to arise. At the same time, the constant oil passage present in the base 15 of the valve body 13 is also additionally open so that even at small piston speeds low damping forces are produced. Furthermore, the recess 23 and the increased annular gap 27 produce lower damping forces at high piston speeds.

The valve spring 17 abuts at its underside against the threaded ring 19, the contraction phase valve 20 being provided on the upper side of the damping piston 11. In order to guide the damping medium from the upper chamber half 24 into the lower chamber half 25 in the extension phase transverse, bores 22 are provided in the hollow piston rod 1 distributed around the periphery.

Figure 2:
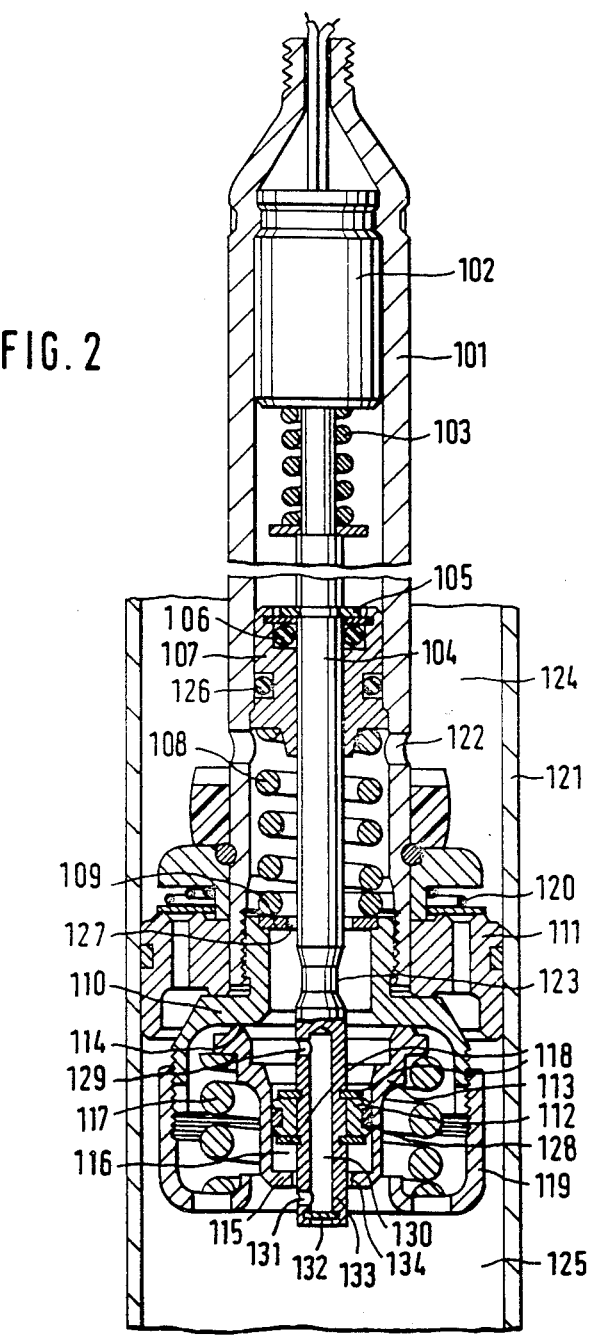
FIG. 2 shows a further form of damper.

The section through an adjustable hydraulic damper illustrated in FIG. 2 shows substantially the cylinder barrel 121, the hollow piston rod 101 on the end of which is secured the damping piston 111. The damping piston 111 divides the interior of the cylinder 121 into two chamber halves 124 and 125. On the upper end of the damping piston 111 is the contraction phase valve 120.

Mounted in a fixed position on the upper end of the hollow piston 101 and within its interior is an electro-magnet 102, into which projects the axially displaceable tension rod acted on by a return spring 103. The rod 104, pre-loaded by the spring 103, abuts through a retaining ring 105 against the tension rod bearing 107. To seal the bearing 107 with respect to the tension rod 104 and the hollow piston rod 101, there are O-rings 106 and 126. The bearing 107 is held in its axial position by a coil spring 108 which abuts at its lower end against a disc 109 on the securing nut 110 for the damping piston 111. Between the tension rod 104 and the disc 109, there is formed the annular gap 127 acting as a throttle and determining the behavior in the extension phase at high piston speeds.

The tension rod 104 has at its lower end a control piston 112 which is guided to be axially movable in the valve body 113. The control lip 114 extends around the periphery of the valve body 113. In the base 115 of the valve body 113, there is an opening 134 through which the rod 104 can move axially. In the lower region 133 of the tension rod 104, there is the blind hole 130 with its radial openings 129 and 131 for flow. According to the position of the control piston 112, the lower opening 131 leads into the lower chamber 125 or into the interior 116 of the valve body 113. In the lower position of the electro-magnet, a constant passage is available for oil through the upper opening 129, the blind bore 130 and the lower opening 131. In the upper position of the rod 104, the lower opening 131 is within the interior 116 of the valve body 113 and by virtue of the closure disc 132 arranged in the tension rod 104, the base 115 of the valve body is closed off with respect to the upper chamber 124 apart from the residual minimum annular cross-section of the opening 134. The control piston 112 is secured on the tension rod 104 by securing rings 118 and sealed by means of a sealing ring 128.

When the tension rod 104 is pulled upwards by the electro-magnet 102, an increased annular gap 127 arises between the disc 109 and the recess 123 in the rod 104. The constant oil passage between the openings 129 and 131 is closed off in this position apart from the annular cross-section of the opening 134.

In the lower position of the tension rod 104, on the other hand, there is a smaller annular gap 127 and, additionally, the constant cross-section oil passage through the upper opening 129, the blind bore 130 and the lower opening 131.

In the lower position of the rod 104, as illustrated, high damping forces are produced in the medium piston speed range by virtue of the smaller exposed area of the valve body 113. In the low piston speed range, the damper fluid flows from the upper opening 129, through the blind bore 130, to the lower opening 131 and then into the lower chamber half 125, producing low damping forces. A constant additional oil passage is still provided by the residual minimum annular cross-section of the opening 134 between the rod 104 and the base 115 of the valve body 113.

When the rod 104 is drawn upwards, the greater exposed area of the valve body 113 (oil can flow around the control piston 112) causes lower damping forces to be produced in the medium piston speed range. By virtue of the fact that then the lower opening 131 in the tension rod 104 comes to lie inside the interior 116 of the valve body 113, then at low piston speeds only still as a reduced constant oil passage does the residual minimum annular cross-section remaining in the opening 134 between the tension rod 104 and the base 115 of the valve body act, resulting in high damping forces.

The respective arrangement of the damping forces at high piston speeds can be achieved by altering the position and shape of the recess 123 on the tension rod 104.

The valve spring 117 abuts at its lower end against the threaded ring 119, the contraction phase valve 120 being provided on the upper end of the damping piston 111. In order to conduct the damping fluid from the upper chamber half 124 into the lower chamber half 125 in the extension phase, transverse bores 122 are arranged in the hollow piston rod 101, distributed around its periphery.

Figure 3:
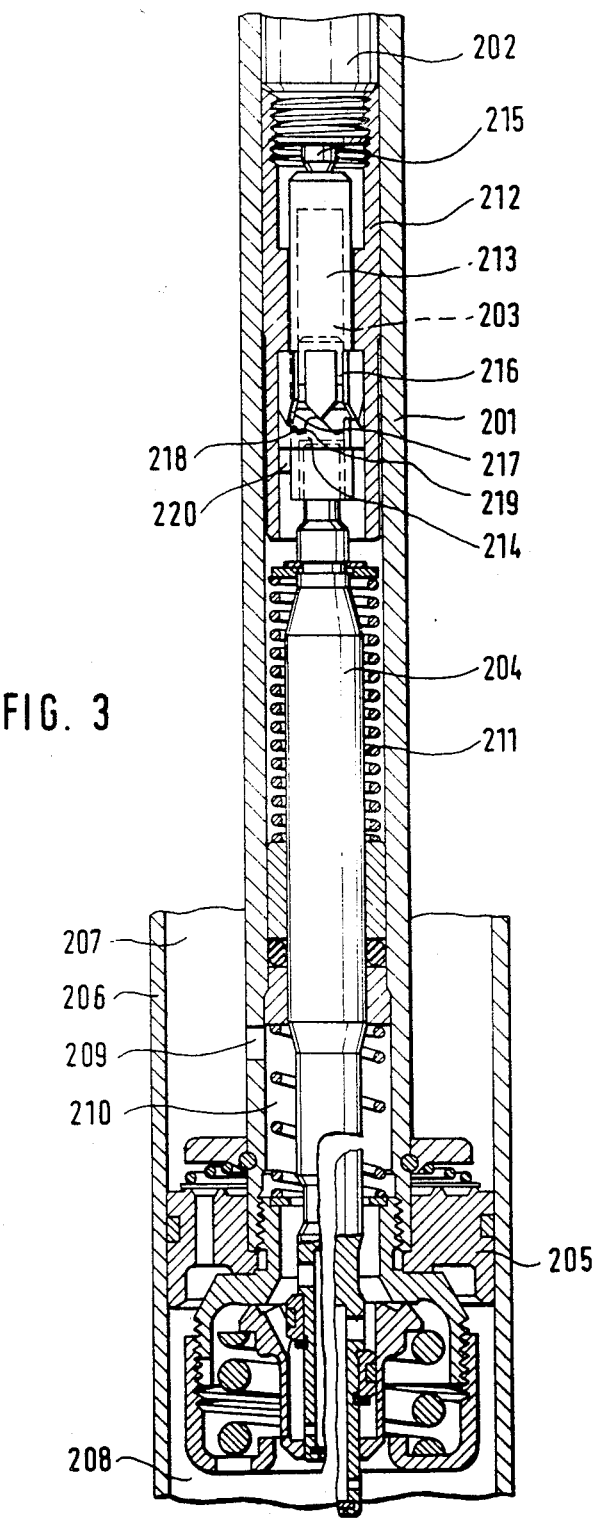
FIG. 3 is a section through a vibration damper with a hollow piston rod in the interior of which is shown an adjusting device, a switch device and the tension rod, the latter being shown in the right hand lower portion as in the extended position.

The section through an adjustable hydraulic damper illustrated in FIG. 3 shows substantially the hollow piston rod 201, in the interior of which there are provided an electro-magnet 202, the switch device 203 and the tension rod 204. Secured to the end of the hollow piston rod 201 is the damper piston 205. The piston 205 divides the interior of the cylinder barrel 206 into the upper chamber half 207 and the lower chamber half 208. The piston 205 is provided with valves for the contraction phase and adjustable valve devices for the extension phase.

A constant oil passage from the upper chamber half 207 to the lower chamber half 208 is provided by the bore 209, arranged above the damper piston 205, and the interior 210 of the hollow piston rod 201.

Arranged at the upper end of the hollow piston rod 201 and in its interior, there is the fixed electro-magnet 202 and the switch device 203 is present between it and the tension rod 204, acted on by a compression spring 211.

The switch device 203 comprises the housing 212, the control rod 213 and the rotating portion 214. The rotating portion 214 is in engagement with the tension rod 204 and the control rod 213 is acted on by the armature spindle 215 of the electro-magnet 202.

In the retracted position illustrated in FIG. 3, the armature spindle 215 of the electro-magnet 202 is in contact with the control rod 213 which is provided on its lower end with grooves 216 extending right through and on its face it is provided with teeth 217. The teeth 217 on the face engage corresponding teeth 218 on the face of the rotating portion 214. The rotating portion is provided on its outer periphery with grooves 219. The upper part of the rotating portion 214 is guided in a bore in the control rod 213 and its lower hollow part is guided on the tension rod 204 of the damper, the rotating portion 214 and the tension rod 204 being in axial and face contact through the compression spring 211 abutting against the tension rod 204. The control rod 213 and the rotating portion 214 are guided to prevent rotation by grooves 216, 219 engaging ribs 220 on the housing 212.

When the electro-magnet 202 receives a pulse of current, the control rod 213 is displaced downwards by the amount of the predetermined stroke of the armature spindle 215, as well as the rotating portion 214 and the tension rod 204. While the control rod 213 remains secured against rotation in the ribs 220 in the housing 212, the rotating portion 214 moves clear of the guide ribs 220 and by virtue of the teeth 217, 218 on their faces, both components perform a partial rotation. When the current ceases, the compression spring 211 pushes the face teeth 218 on the rotating portion 214 against the ends of the ribs 220 in the housing 212, so that the rotating portion 214 completes a further rotation and the ribs 220 abut axially and forcibly into the roots of the teeth 218 on the face of the rotating portion 214. In this way, the lower, extended switch position of the switch is attained.

On the arrival of a further current pulse, the previously mentioned components, engaging axially in contact, are again urged downwards by the armature spindle 215; and the rotating portion 214, after moving clear of the ribs 220 in the housing 212, again performs a partial rotation as a result of the engagement of the teeth on the face. When the current is now broken, the compression spring 211 urges the rotating portion 214 and its face teeth 218 against the lower ends of the ribs 220 in the housing, producing further rotation of the portion 214 and arriving at the starting or retracted position of the switch device 203. The grooves 219, on the rotating portion 214, are again guided and located against rotation by the ribs 220 on the housing 212.

Figure 4:
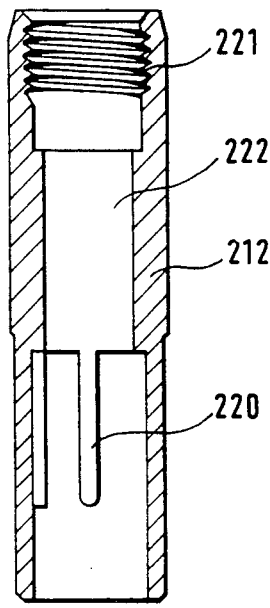
FIG. 4 shows a section through a housing of the switching device.

In FIG. 4, the housing 212 is shown in section, ribs 220 being provided in the lower region and serving to guide the rotating portion 214 and the control rod 213. Provided in the upper part of the housing 212 is a screw thread 221 for receiving the electro-magnet 202. The control rod is guided in the cylindrical bore 222.

Figure 5:
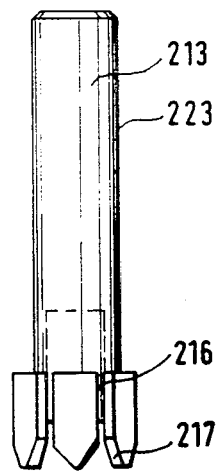
FIG. 5 shows a control rod in elevation.

FIG. 5 shows the control rod 213 as an individual component, the upper cylindrical region 223 being received in the housing 212 and the lower region being provided with the teeth 217 on its face and with the grooves 216. These grooves 216 engage in the ribs 220 in the housing 212.

The face teeth 217 and the grooves 216 are distributed uniformly around the periphery.

Figure 6:
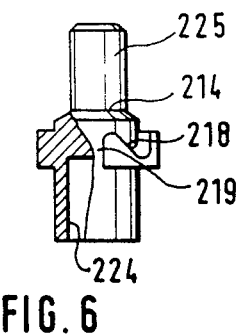
FIG. 6 shows a rotating portion, partially sectioned and partially in elevation.

In FIG. 6, the rotating portion 214 is illustrated partly in section and partially in elevation. The lower region 224 serves to receive the tension rod 204 and the upper cylindrical region 225 is received in a bore in the control rod 213. Also in the rotating portion 214, the face teeth 218 and the grooves 219 are distributed uniformly around the periphery.

The invention is not to be taken as limited to all the details that are described hereinabove, since modifications and variations thereof may be made without departing from the spirit or scope of the invention.

What is claimed is:

1. In an adjustable hydraulic damper apparatus having a hollow piston rod operably connected to a damping piston means which divides the interior of a cylinder member into first and second halves filled with damping fluid, at least one throttle disposed in said interior of said cylinder member for passing at least a portion of said damping fluid acted upon in operation by said damping piston means, said hollow piston rod including a transverse bore disposed above said damping piston means for the constant passage of said damping fluid therethrough, and an axially displaceable rod disposed within the interior of said hollow piston rod and connected to means for adjusting, the improvement to said damper apparatus wherein: said axially displaceable rod comprises a tension rod and defines in combination with the inner surface of said hollow piston rod an annular gap which functions as a throttle restriction, said axially displaceable rod having an outer surface which defines in the region adjacent the annular gap a recessed portion, which recessed portion provides in combination with said annular gap over a corresponding range of movement of said axially displaceable rod relative to said hollow piston rod, an opening of increased cross-sectional dimension, said adjusting means having electromagnetic means for moving said axially displaceable rod at least axially over said range of movement and wherein a lower portion of said axially displaceable rod adjacent said recessed portion is operably associated with a control piston means which is axially displaceable within a cylindrical inner surface of a valve body disposed within the interior of the cylinder, said valve body being operably associated with the lower portion of said tension rod, said valve body including a control lip which extends around the periphery of said valve body defining therein a constant oil passage in the region thereof which is nearest said damping piston means and wherein said valve body includes, in a base portion thereof, a further oil passage which can be closed by the control piston lower portion of said tension rod, said electromagnetic means being disposed within said hollow piston rod, said electromagnetic means having biasing means for returning said axially displaceable rod to a predetermined position, said biasing means being substantially the sole biasing means disposed to transmit substantial forces to said axially displaceable rod and whereby said axially displaceable rod is at least rapidly axially movable by said electromagnetic means during operation to adjust the damping of said damping apparatus, to provide different damping and be substantially contemporaneously responsive over a range of operationally variable varying piston speeds from low speeds to high speeds of said damping piston means as speeds of said damping piston means vary during operation, thereby compensating for, at least, rapid variations of said piston speeds.

2. The improved adjustable hydraulic damper apparatus according to claim 1 wherein the recess defined on the outside surface of the axially displaceable rod is in the form of an annular groove.

3. The improved adjustable hydraulic damper apparatus according to claim 1 wherein a disc means is disposed within the interior of the hollow piston rod which disc means defines therein the annular gap.

4. The improved adjustable hydraulic damper apparatus according to claim 1 wherein a valve spring is disposed between the underside of the control lip and an abutment surface on a threaded ring.

5. The improved adjustable hydraulic apparatus according to claim 4 wherein the valve body has an inside diameter which expands progressively in a direction toward the permanent oil passage.

6. The improved adjustable hydraulic damper apparatus according to claim 1 wherein the axially displaceable rod is guided by, and sealed in, a bearing means disposed in the interior of the hollow piston rod.

7. The improved adjustable hydraulic damper apparatus according to claim 6 wherein the axially displaceable rod bearing means has on its cylindrical outer surface an annular groove for receiving a seal means therein.

8. The improved adjustable hydraulic damper apparatus according to claim 6 wherein the axially displaceable rod bearing means has on its cylindrical surface an annular groove for receiving a seal means therein.

9. The improved adjustable hydraulic damper apparatus according to claim 1 wherein said electromagnetic adjusting means comprise a fixed electro-magnetic device which is disposed within the hollow piston rod and cooperates with the axially displaceable rod, said electro-magnetic device being connected to a control unit.

10. The improved adjustable hydraulic damper apparatus according to claim 9 wherein the control unit is responsive to the output of computer means.

11. The improved adjustable hydraulic damper apparatus according to claim 1 wherein said axially displaceable rod has a control portion, said control portion having a cross-sectional dimension and wherein the valve body has in its base an opening which corresponds with the cross-sectional dimension of the control piston portion of the axially displaceable rod, which control piston portion of said axially displaceable rod extends through said opening; and wherein the control piston portion of the axially displaceable rod has in the region of the valve body base a longitudinal bore therein which is closed at one end of the axially displaceable rod and which is provided, above and below the control piston portion, with at least one radially extending opening for fluid flow therethrough, the opening at one end thereof leading from above the control piston portion of the axially displaceable rod into the interior portion of the valve body and the opening below the control piston portion of the axially displaceable rod leading into the second, lower, chamber half defined within the interior of the cylinder by the damping piston means.

12. The improved adjustable hydraulic damper apparatus according to claim 11 wherein the radially extending openings for fluid flow are holes which extend at right angles with respect to the longitudinal bore of the axially displaceable rod.

13. The improved adjustable hydraulic damper apparatus according to claim 11 wherein the longitudinal bore within the axially displaceable rod which is closed at the one end thereof is closed by means of a closure disc.

14. The improved adjustable hydraulic damper apparatus according to claim 13 wherein the closure disc is force-fitted in the axially displaceable rod longitudinal bore.

15. The improved adjustable hydraulic damper apparatus according to claim 14 wherein the axially displaceable rod recess portion is defined by at least two stepped shoulders and wherein the electromagnetic adjusting means produces a number of operative positions of the axially displaceable rod recess portion according to the number of stepped shoulder portions.

16. The improved adjustable hydraulic damper apparatus according to claim 1 including a switch device disposed between the electromagnetic adjusting means and the axially displaceable rod, said switch device having positions corresponding to at least two axially different positions of the axially displaceable rod and wherein said axially displaceable rod is urged by a spring means towards said electromagnetic adjusting device.

17. The improved adjustable hydraulic damper apparatus according to claim 16 wherein the switch device comprises a housing having therein a control rod portion on to which is disposed a rotating portion.

18. The improved adjustable hydraulic damper apparatus according to claim 17 wherein the control rod and the rotating portion of the switch device are provided with axially extending grooves on the periphery thereof which facilitate axial movement in corresponding axially extending ribs in the housing portion of the switch device.

19. The improved adjustable hydraulic damper apparatus according to claim 18 wherein the grooves and the ribs are uniformly distributed about the periphery of the housing of the switch device.

20. The improved adjustable hydraulic damper apparatus according to claim 17 wherein the rotating portion of the switch device is operatively associated with the axially displaceable rod.

21. The improved adjustable hydraulic damper apparatus according to claim 17 wherein the electro-magnetic adjusting means is an electro-magnet having an armature spindle which engages the control rod.

22. In an adjustable hydraulic damper apparatus having a hollow piston rod operable connected to a damping piston means which divides the interior of a cylinder member into first and second valves filled with damping fluid, at least one throttle disposed in said interior of said cylinder member for passing at least a portion of said damping fluid acted upon in operation by said damping piston means, said hollow piston rod including a transverse bore disposed above said damping piston means for the constant passage of said damping fluid therethrough, and an axially displaceable rod disposed within the interior of said hollow piston rod and connected to means for adjusting, the improvement to said damper apparatus wherein: said axially displaceable rod comprises a tension rod and defines, in combination with the inner surface of said hollow piston rod, an annular gap which functions as a throttle restriction, said axially displaceable rod having an outer surface which defines, in the region adjacent the annular gap, a recessed portion, which recesses portion provides, in combination with said annular gap over a corresponding range of movement of said axially displaceable rod relative to said hollow piston rod, an opening of increased cross-sectional dimension, said adjusting means having electromagnetic means for moving said axially displaceable rod at least axially over said range of movement and wherein a lower portion of said axially displaceable rod adjacent said recessed portion is operably associated with a control piston means which is axially displaceable within a cylindrical inner surface of a valve body disposed within the interior of the cylinder, said valve body being operably associated with the lower portion of said tension rod, said valve body including a control lip which extends around the periphery of said valve body defining therein a constant oil passage in the region thereof which is nearest said damping piston means and wherein said valve body includes, in a base portion thereof, a further oil passage which can be closed by the control piston lower portion of said tension rod, and wherein the constant oil passage is defined by a collar on the valve body in combination with the face of a securing nut, and wherein a valve spring is disposed between the underside of said collar and an abutment surface on a threaded ring, said electromagnetic means being disposed within said hollow piston rod, said electromagnetic means having biasing means for returning said axially displaceable rod to a predetermined position, said biasing means being substantially the sole biasing means disposed to transmit substantial forces to said axially displaceable rod and whereby said axially displaceable rod is at least rapidly axially movable by said electromagnetic means during operation to adjust the damping of said damping apparatus, to provide different damping and be substantially contemporaneously responsive over a range of operationally variable varying piston speeds from low speeds to high speeds of said damping piston means as speeds of said damping piston means vary during operation, thereby compensating for, at least, rapid variations of said piston speeds.

23. The improved adjustable hydraulic damper apparatus according to claim 22 wherein the valve body has an inside diameter which expands progressively in a direction toward the constant oil passage.

* * * * *